United States Patent [19]
Enders

[11] Patent Number: 5,721,409
[45] Date of Patent: Feb. 24, 1998

[54] ELECTRICALLY CONDUCTIVE THERMOPLASTIC COUPLER FOR FUSING A HORN SWITCH BACKING PLATE TO AN AIRBAG MODULE COVER

[75] Inventor: Mark L. Enders, North Ogden, Utah

[73] Assignee: Morton International, Inc., Chicago, Ill.

[21] Appl. No.: 658,321

[22] Filed: Jun. 5, 1996

[51] Int. Cl.$^6$ .............................. H01H 9/00; B60R 21/16
[52] U.S. Cl. ........................................ 200/61.54; 280/731
[58] Field of Search ......................... 200/61.54; 280/731; 29/622

[56] References Cited

U.S. PATENT DOCUMENTS

| | | | |
|---|---|---|---|
| 4,314,114 | 2/1982 | Larson | 200/5 A |
| 5,186,490 | 2/1993 | Adams et al. | 280/731 |
| 5,286,952 | 2/1994 | McMills et al. | 219/535 |
| 5,369,232 | 11/1994 | Leonelli | 200/61.54 |
| 5,399,819 | 3/1995 | Lang et al. | 200/61.54 |
| 5,481,799 | 1/1996 | McGaffigan | 29/879 |
| 5,523,532 | 6/1996 | Leonelli et al. | 200/61.54 |
| 5,575,498 | 11/1996 | Elqadah et al. | 280/731 |
| 5,585,606 | 12/1996 | Ricks | 200/61.08 |
| 5,590,902 | 1/1997 | Eckhout | 280/728.3 |

Primary Examiner—Michael L. Gellner
Assistant Examiner—Michael J. Hayes
Attorney, Agent, or Firm—George W. Rauchfuss, Jr.; Gerald K. White

[57] ABSTRACT

An airbag module cover assembly having a horn switch backing plate secured to a module cover with an electrically conductive thermoplastic coupler. The module cover includes a switch cover panel having an outer face and an inner face, and a horn switch is positioned adjacent the inner face. A spacer extending inwardly from and substantially surrounding the inner face peripherally retains the horn switch, and the switch backing plate is supported by the spacer and extends over and retains the horn switch within the spacer. The spacer has a height that is greater than a thickness of the horn switch so that the horn switch does not substantially contact both the backing plate and the inner face simultaneously and, therefore, is not compressed between the backing plate and the inner face prior to the switch cover panel being depressed by a vehicle driver. The electrically conductive, thermoplastic coupler is positioned between the spacer and the backing plate and is fused to both the spacer and the backing plate, securing the backing plate to the module cover. The coupler is a conductive polymer heating strip composed of ultra-high molecular weight polyethylene, and the coupler can also include a layer or layers of material or adhesive that will fuse to both the module cover and the backing plate. A method of attaching the backing plate to the module cover using the coupler, and a method of removing the backing plate for repair or replacement of the horn switch are also provided.

19 Claims, 4 Drawing Sheets

ELECTRICALLY CONDUCTIVE THERMOPLASTIC COUPLER FOR FUSING A HORN SWITCH BACKING PLATE TO AN AIRBAG MODULE COVER

FIELD OF THE INVENTION

The present invention relates to a new and useful airbag module cover assembly of a vehicle airbag module, and more particularly, to a horn switch backing plate fused to a module cover of the airbag module cover assembly with an electrically conductive thermoplastic coupler. The present invention also relates to a method of attaching the horn switch backing plate to the module cover and a method of removing the backing plate from the module cover for repair or replacement of a horn switch of the airbag module cover assembly.

BACKGROUND OF THE INVENTION

An airbag module is employed in an automobile for protecting an occupant against injury by deploying an inflated airbag cushion to physically restrain the occupant's body when the automobile encounters a collision. A driver side airbag module includes a module cover normally having a horn switch, for actuating the vehicle horn, and a horn switch backing plate attached to an inner surface of the module cover.

A number of horn switch designs have included a membrane type switch. Membrane type switches conventionally comprise two very thin sheets having conductive coatings which are normally separated by thin spacers. Pressure on the switch pushes the conductive surfaces together to close a circuit and actuate the horn. Pressure is applied to the horn switch by the airbag module cover in the hub of the steering wheel, which is depressed by the driver.

An airbag module cover having a floating membrane horn switch freely retained between an inner surface of the airbag module cover and a horn switch backing plate has been proposed. The switch backing plate is spaced from the module cover by ridges that are unitary with and extend from the inner surface of the cover and substantially surround the horn switch. The height of the spacer is greater than the thickness of the horn switch so that the switch is not compressed between the cover and backing plate prior to actuation by the driver. The backing plate is secured to the ridges by a plurality of stakes that are unitary with and extend from the ridges through holes in the backing plate. Distal ends of the stakes are formed into heads, or distal ends of pairs of stakes are joined to form bridges using ultrasonic welding.

Although the stakes and the ultrasonic welding method of assembly strongly secure the backing plate to the module cover, the deformed stakes do not allow easy removal of the backing plate from the cover for servicing of a defective horn switch. The entire module cover, therefore, must be replaced in addition to the defective horn switch. Also, the horn switch can sometimes be damaged by heat produced during the ultrasonic welding process. In addition, the ultrasonic welding limits the types of plastics that can be used for the module cover. For example, a module cover having stakes that are to be ultrasonically welded can be made of an amorphous polystyrene-ethylene/butylene-styrene (SEBS) plastic. While the SEBS plastic allows ultrasonic welding, it is difficult to paint and requires a primer and elaborate power wash prior to painting, complicating the manufacturing process. Thus for manufacturing purposes it would be preferably to employ a thermoplastic polyester elastomer such as DYM-100, a product of E. I. DuPont de Nemours Co., which is more easily painted. DYM-100, however, is not conducive to ultrasonic welding.

A general object, therefore, of the present invention is to provide an airbag module cover having a new and improved horn switch backing plate attachment.

A more specific object of the present invention is to provide an airbag module cover having a horn switch backing plate attachment that is not ultrasonically welded to the airbag module cover.

Another object of the present invention is to provide an airbag module cover having a horn switch backing plate attachment that is relatively easy to assemble to an airbag module and easy to remove for servicing or replacement.

An additional object of the present invention is to provide an airbag module cover having a horn switch backing plate attachment that is strong enough to ensure that the backing plate will remain attached to the module cover during deployment of an airbag cushion through a tear seam of the cover.

A further object of the present invention is to provide an airbag module cover having a horn switch backing plate attachment that allows the use of a number of different types of thermoplastic materials for the module cover and, in particular, readily paintable materials such as DYM-100 polymers.

Still another object of the present invention is to provide a new and improved method of attaching a horn switch backing plate to an airbag module cover.

Yet an additional object of the present invention is to provide a new and improved method of replacing a horn switch of an airbag module cover that does not require the replacement of the module cover itself.

SUMMARY OF THE INVENTION

In carrying out this invention, there is provided an airbag module cover assembly with a horn switch for operation by a vehicle driver. The assembly includes a module cover including a thermoplastic switch cover panel having an outer face and an inner face. The outer face forms a portion of the airbag module cover presented to the driver, and the switch cover panel is deformably depressible from the outer face. The horn switch is for closing a horn switch circuit to activate a remote vehicle horn upon being compressed, and the horn switch is received adjacent the inner face of the switch cover panel. A thermoplastic spacer extends inwardly from and substantially surrounds the inner face of the switch cover panel, and the spacer peripherally retains the horn switch.

A thermoplastic switch backing plate is supported by the spacer and extends over and retains the horn switch within the spacer. The spacer has a height greater than a thickness of the horn switch so that the horn switch does not substantially contact both the backing plate and the inner face simultaneously and, therefore, is not compressed between the backing plate and the inner face prior to the switch cover panel being depressed by a vehicle driver.

An electrically conductive, thermoplastic coupler is positioned between the spacer and the backing plate, and the coupler is fused to both the spacer and the backing plate, securing the backing plate to the module cover.

According to one aspect of the present invention, the switch cover panel of the module cover defines a tear seam dividing the inner face into a first half and a second half. A plurality of spaced-apart raised force concentrators are unitary with and extend inwardly from the first half and the second half of the inner face of the switch cover panel for translating a distributed load applied to the outer face of the switch cover panel into at least one point load. The horn switch is a membrane horn switch having a first section received adjacent the first half of the inner face, and a second section received adjacent the second half of the inner face, and the first section of the horn switch is connected to the second section by a bridge.

The spacer is unitary with the inner face of the switch cover panel and is in the form of a first raised ridge substantially surrounding the first half of the inner face and peripherally retaining the first section of the membrane horn switch, and a second raised ridge substantially surrounding the second half of the inner face and peripherally retaining the second section of the membrane horn switch. The switch backing plate defines a tear seam generally positioned over the tear seam of the switch cover panel. The height of the spacer is greater than the sum of the thickness of the membrane horn switch and a height of the force concentrators, and the membrane horn switch is unsecured to either the inner face, the spacer or the backing plate. The coupler is generally in the shape of both the first raised ridge and the second raised ridge.

According to another aspect of the present invention, the coupler is a closed circuit. According to an additional aspect of the present invention, the coupler is an open circuit and extends from a first contact ear to a second contact ear.

A method of attaching a horn switch backing plate to a module cover is also provided. A module cover and a horn switch as described above are provided and the horn switch is positioned adjacent the inner face, peripherally retained by the spacer. A coupler as described above is provided and positioned on the spacer, and a switch backing plate as described above is provided and positioned on the coupler so that the switch backing plate extends over and retains the horn switch within the spacer.

Pressure is applied to the backing plate, and an electrical current is applied to the coupler until the coupler and a portion of the backing plate and a portion of the spacer in contact with the coupler melt and are fused together to secure the backing plate to the module cover.

According to one aspect of the present invention, the coupler is a closed circuit. The electrical current is applied to the coupler by first placing a coiled wire in the shape of the coupler over the backing plate, in alignment with the coupler. An electrical current is applied directly to the coiled wire, and the electrified coiled wire creates electromagnetic energy which, in turn, creates an electrical current in the coupler.

According to another aspect of the present invention, the coupler is an open circuit extending from a first contact ear to a second contact ear. The electrical current is applied directly to the coupler by attaching leads from a remote power source to the first and second contact ears of the coupler.

A method of repairing or replacing a horn switch of an airbag module cover is also provided and includes providing an airbag module cover assembly as described above. An electrical current is applied to the coupler until the coupler and a portion of the backing plate and a portion of the spacer in contact with the coupler melt. The switch backing plate and the coupler are then removed from the spacer and the horn switch is removed from within the spacer. A replacement horn switch is provided and positioned within the spacer adjacent the inner face. A coupler is positioned on the spacer, and a switch backing plate is positioned on the coupler, so that the switch backing plate extends over and retains the horn switch within the spacer. As described above, pressure is applied to the backing plate, and an electrical current is applied to the coupler until the coupler and a portion of the backing plate and a portion of the spacer in contact with the coupler melt and fuse together.

The invention together with further objects, features, advantages and aspects thereof, will be more clearly understood from the following description taken in connection with the accompanying drawings.

BRIEF DESCRIPTION OF THE DRAWINGS

The same reference numerals refer to the same elements throughout the various figures.

DETAILED DESCRIPTION OF THE INVENTION

Figure 1:
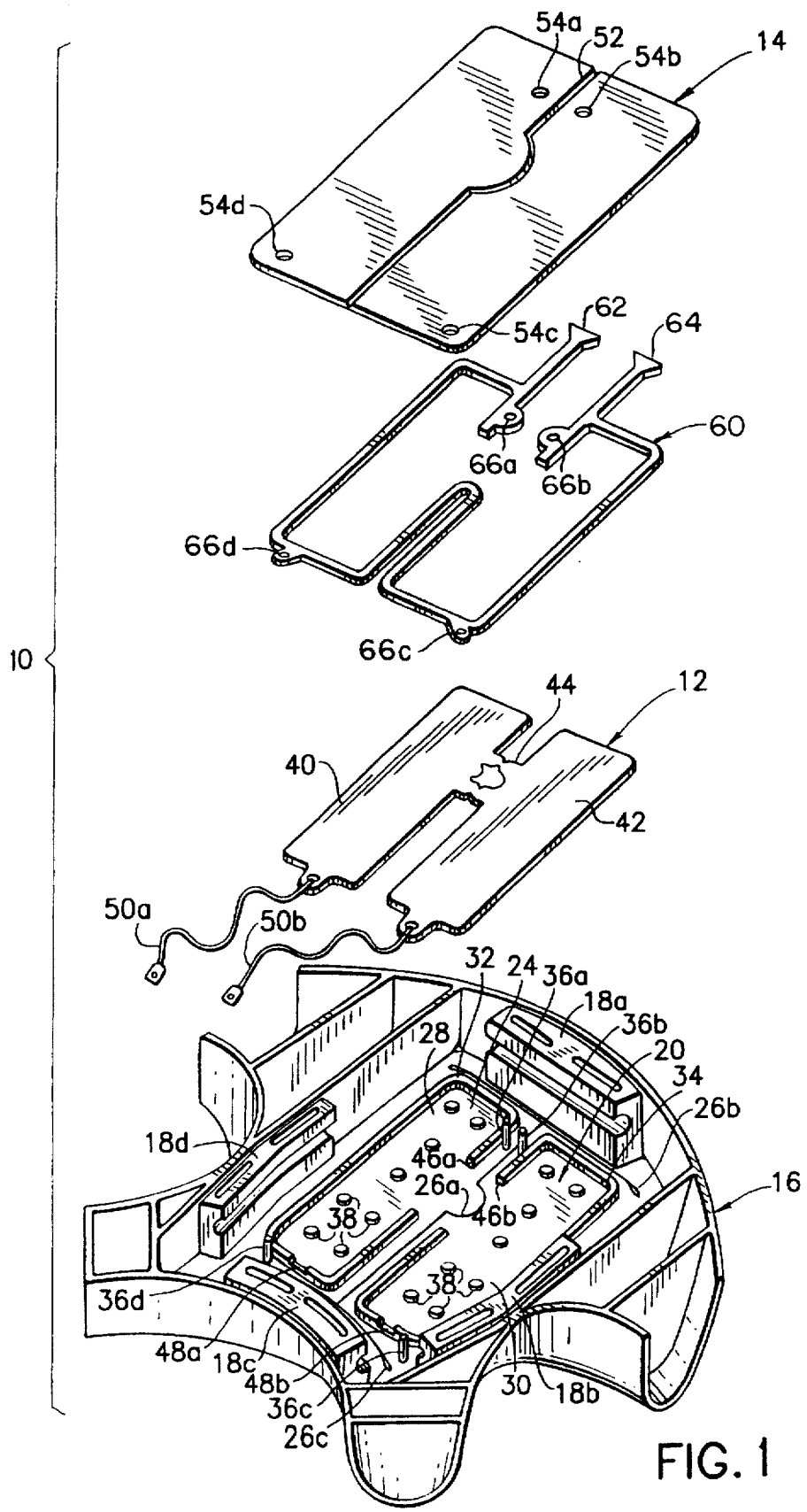
FIG. 1 is an exploded, perspective view of an airbag module cover according to the present invention.
Figure 2:
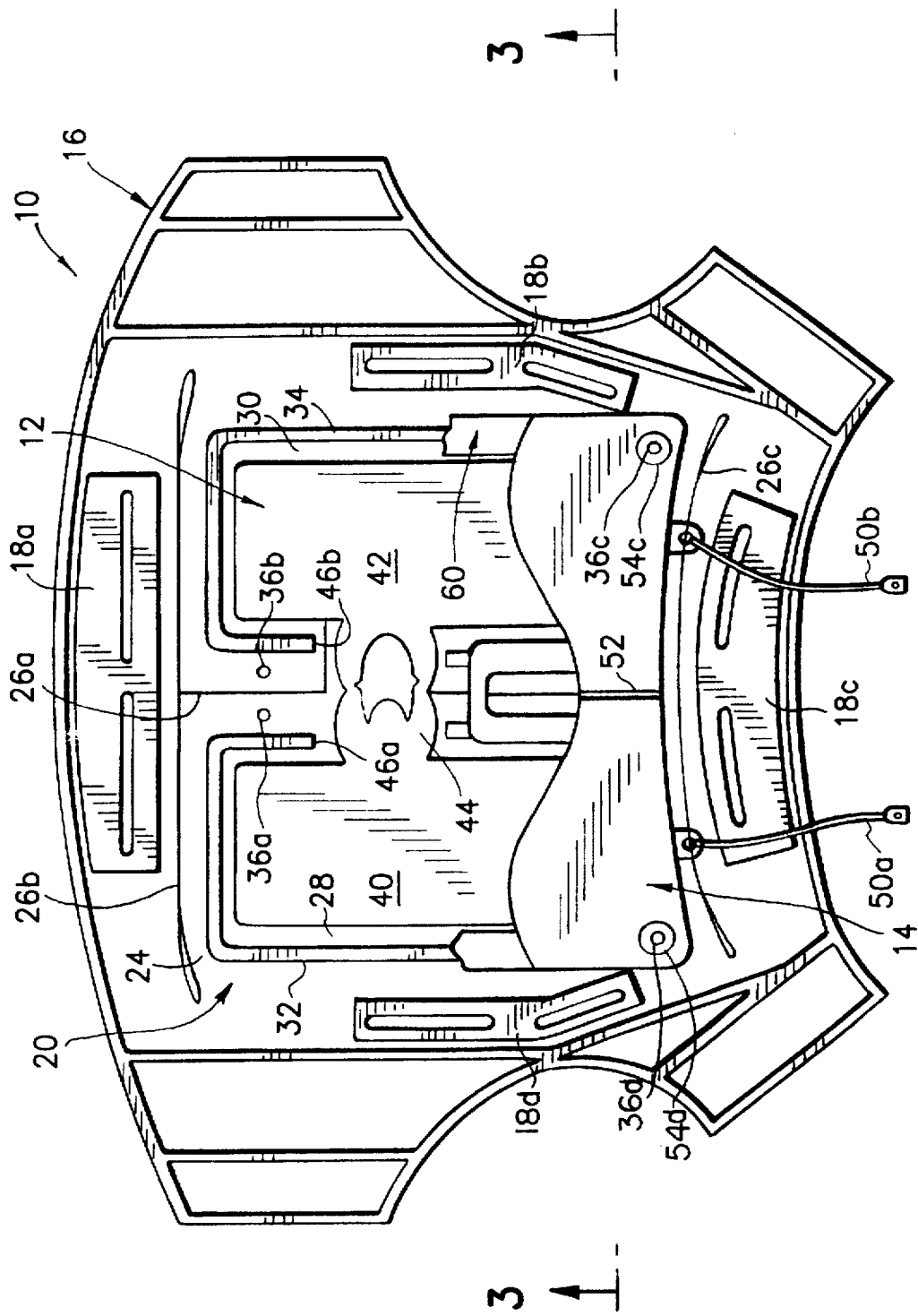
FIG. 2 is a bottom plan view, partially in section, of the airbag module cover of FIG. 1.
Figure 3:
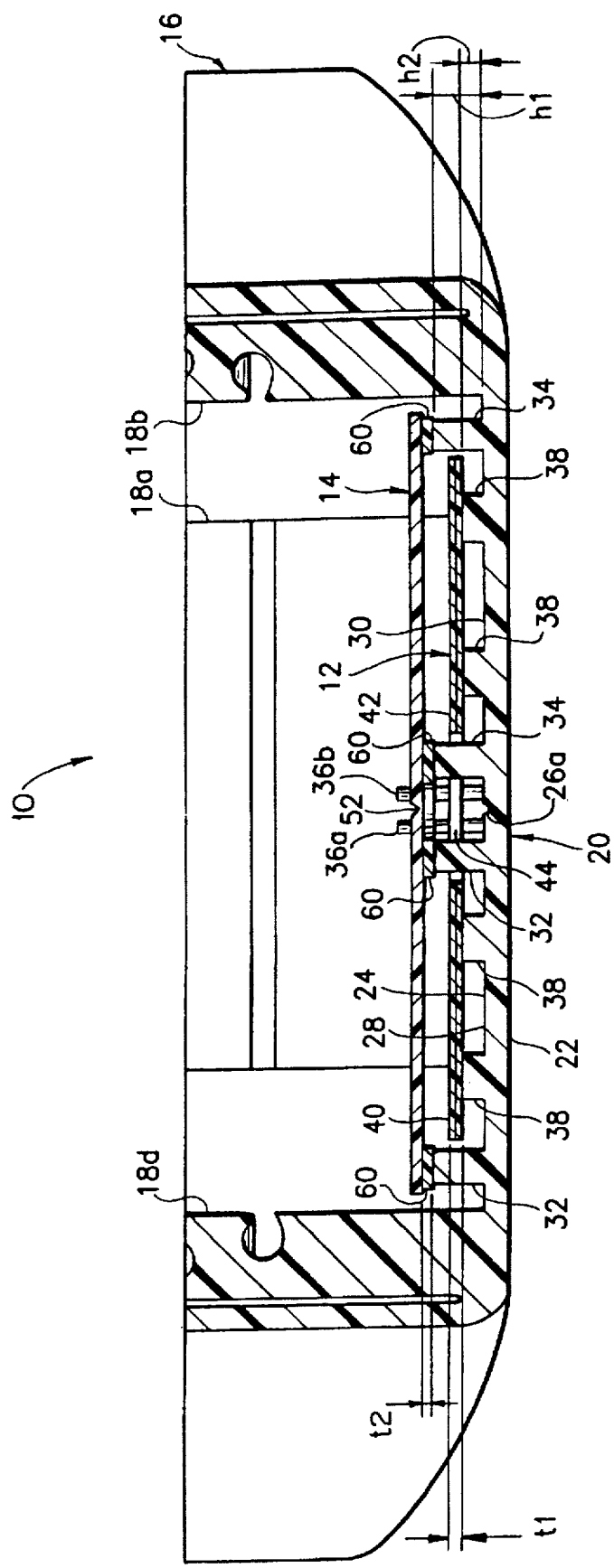
FIG. 3 is a cross-sectional view of the airbag module cover taken along the line 3—3 of FIG. 2.

Referring to FIGS. 1 through 3, the present invention is directed to an airbag module cover assembly 10 having a horn switch 12 and a horn switch backing plate 14 secured to a module cover 16. A method of attaching the backing plate 14 to the module cover 16 and a method of removing the backing plate from the module cover for repairing or replacing the horn switch 12 are also provided. The airbag module cover assembly 10 is for use with a driver side airbag module (not shown) mounted within a hub of a steering wheel, and the horn switch 12 is for operation by a vehicle driver.

The module cover 16 is, for example, a thermoplastic polyester elastomer such as DYM-100, a product of E. I. DuPont de Nemours Co., and can include attachment arms 18a,18b,18c,18d for securing the module cover to a module housing (not shown) of an airbag module. The module cover 16 also includes a generally rectangular switch cover panel 20 having a decorative outer face 22 and an inner face 24. The decorative outer face 22 (shown in FIG. 3) forms a portion of the module cover 16 presented to the driver, and the switch cover panel 20 is deformably depressible from the outer face. The switch cover panel 20 defines a first, a second and a third tear seam 26a,26b,26c generally forming an "T" dividing the inner face 24 into a first half 28 and a second half 30. A spacer is unitary with and extends inwardly from and substantially surrounds the inner face 24 of the switch cover panel 20. The spacer is in the form of a first raised ridge 32 substantially surrounding the first half 28 of the inner face 24, and a second raised ridge 34 substantially surrounding the second half 30 of the inner face. Four spaced-apart posts 36a,36b,36c,36d also extend inwardly from the inner face 24.

The module cover 16 can additionally include a plurality of spaced-apart raised force concentrators 38 unitary with and extending inwardly from the first half 28 and the second half 30 of the inner face 24 of the switch cover panel 20. The force concentrators 38 are for translating a distributed load applied to the outer face 22 of the switch cover panel 20 into at least one concentrated load applied to the horn switch 12.

The force concentrators 38 are in the form of generally cylindrical studs, but can alternatively be provided in any suitable non-cylindrical shapes, such as squares, elongated ribs or X's for example.

The membrane horn switch 12 is for closing a horn switch control circuit (not shown) to activate a remote vehicle horn upon being compressed. Membrane horn switches are known to those skilled in the art and an example of a membrane horn switch is shown and described in U.S. Pat. No. 5,369,232. Generally, the membrane horn switch comprises two very thin sheets of flexible substrate having conductive coatings thereon which are separated by thin spacers. Pressure on the membrane horn switch pushes the conductive coatings together to close a horn control circuit that the membrane horn switch is connectable to in order to actuate a remote horn. The horn switch 12 has a generally rectangular first section 40 received adjacent the first half 28 of the inner face 24 and peripherally retained by the first raised ridge 32, and a generally rectangular second section 42 received adjacent the second half 30 of the inner face and peripherally retained by the second raised ridge 34. The first section 40 of the horn switch 12 is connected to the second section 42 by a rupturable bridge 44 that crosses over the first tear seam 36a.

Each of the first and the second raised ridges 32,34 defines a break 46a,46b for the rupturable bridge 44 of the horn switch 12, and defines notches 48a,48b for leads 50a,50b of the horn switch. The first and the second raised ridges 32,34 are longer and wider than the first and the second sections 40,42 of the horn switch 12 so that the horn switch is loosely retained by the first and the second raised ridges.

The switch backing plate 14 is generally rectangular and is supported by the first and the second raised ridges 32,34 and extends over and retains the first and the second sections 40,42 of the horn switch 12 within the raised ridges. The switch backing plate 14 defines a tear seam 52 generally positioned over the tear seam 26a of the switch cover panel 20, and also defines four openings 54a,54b,54c,54d receiving the four posts 36a,36b,36c,36d extending from the inner face 24 of the switch cover panel for correctly positioning the backing plate. The switch backing plate 14 has a suitable thickness and is made from a suitably light weight and rigid material such as polycarbonate, for example.

As shown in FIG. 3, a height h1 of each of the first and the second raised ridges 32,34 is greater than a thickness t1 of the horn switch 12 so that the horn switch does not substantially contact both the backing plate 14 and the inner face 24 simultaneously and, therefore, is not compressed between the backing plate and the inner face prior to the switch cover panel 20 being depressed by a vehicle driver. Preferably, the horn switch 12 is not secured to either the inner face 24, the first and the second raised ridges 32,34 or the backing plate 14. If the module cover 16 includes force concentrators 38, the height h1 of each of the first and the second raised ridges 32,34 is greater than the sum of both the thickness t1 of the horn switch 12 and a height h2 of the force concentrators so that the force concentrators do not compress the horn switch against the backing plate 14 prior to the switch cover panel 20 being depressed by a vehicle driver. As an example, the thickness t1 of the membrane horn switch 12 can be about 0.02 inches (0.5 millimeters), the height h1 of the first and the second raised ridges 32,34 each can be about 0.12 inches (3.0 millimeters), and the height h2 of each of the force concentrators can be about 0.02 inches (0.5 millimeters).

It should be noted that the shape of the switch cover panel 20, the horn switch 12 and the backing plate 14 are dependent on such factors as the shape of the airbag module, the preferred position of the tear seams 26a,26b,26c and the exterior design of the module cover 16. The switch cover panel 20, the horn switch 12 and the backing plate 14, therefore, can be provided in other shapes, such as circular or oval, and may also be curved for example, without departing from the true spirit and scope of the present invention.

A generally flat, electrically conductive, thermoplastic coupler 60 is positioned between the first and the second raised ridges 32,34 and the backing plate 14. The coupler 60 is fused to both the raised ridges 32,34 and the backing plate 14, securing the backing plate to the module cover 16. The coupler 60 is an open circuit generally in the shape of the first and the second raised ridges 32,34 and has a first contact ear 62 and a second contact ear 64. The coupler 60 also defines four openings 66a,66b,66c,66d receiving the four posts 36a,36b,36c,36d extending from the inner face 24 of the switch cover panel 20 for correctly positioning the coupler with respect to the first and the second raised ridges 32,34. The coupler 60 is relatively thin and can have a thickness t2 of about 0.04 inches (1.0 millimeters) for example.

The coupler 60 includes a conductive polymer heating strip composed of ultra-high molecular weight polyethylene that can be supplied with varied geometries and electrical characteristics. Such a conductive polymer heating strip is supplied, for example, by Raychem Corporation of Menlo Park, Calif. under the trademark Bondline 1000. In addition, if the module cover 16 and the backing plate 14 are made of materials that will not fuse compatibly with each other or with the polymer heating strip, the coupler 60 can also include a layer or layers of material or adhesive that will fuse to both the module cover and the backing plate. Combinations of compatible thermoplastics and adhesives are know in the art and therefore not discussed here in detail. The present invention therefore allows the use of a number of different types of thermoset and thermoplastic materials for the module cover and, in particular, readily paintable materials such as DYM-100 polymers.

The method of attaching the horn switch backing plate 14 to the airbag module cover 16 includes assembling the module cover so that the horn switch 12 is positioned within the spacer adjacent the inner face 24 of the switch cover panel 20, the coupler 60 is positioned on the first and the second raised ridges 32,34, and the backing plate is positioned on the coupler 60 so that the backing plate extends over and retains the horn switch within the first and the second raised ridges. The module cover 16 is then placed within a holding fixture for support and a suitable amount of pressure, of generally between about 5 psi and about 100 psi, is applied to the backing plate 14.

A suitable electrical current, of generally between about 50 v and about 140 v, is applied to the coupler 60 for a time sufficient to permit the coupler to reach a high enough temperature, of generally between about 180° C. and about 400° C., so that the coupler and a portion of the backing plate 14 and a portion of the first and the second raised ridges 32,34 in contact with the coupler begin to melt. The electrical current is then removed from the coupler 60 and the coupler is allowed to cool or solidify and thereby fuse to both the backing plate 14 and the first and the second raised ridges 32,34, securing the backing plate to the module cover 16.

The method of removing the secured horn switch 12 backing plate 14 from the airbag module cover 16 in order to repair or replace the horn switch includes applying a suitable electrical current to the coupler 60 of the assembled module cover assembly 10 until the coupler and a portion of the backing plate and a portion of the first and the second raised ridges 32,34 in contact with the coupler melt. The backing plate 14 and the coupler 60 are then removed from the first and the second raised ridges 32,34 to gain access to the horn switch 12 within the first and the second raised ridges.

A replacement horn switch is provided and positioned within the first and the second raised ridges 32,34 adjacent the inner face 24. By replacement horn switch, it is meant that either the original horn switch 12 is repaired or a new horn switch is provided. The coupler 60 is repositioned on the first and the second raised ridges 32,34, and the backing plate 14 is repositioned on the coupler, so that the backing plate extends over and retains the replacement horn switch within the first and the second raised ridges 32,34. A replacement coupler and a replacement backing plate may alternatively be provided and positioned on the module cover 16. As described above, pressure is applied to the backing plate 14 and a current is applied to the coupler 60 to re-secure the backing plate to the module cover 16.

Preferably, the electrical current is applied to the coupler 60 by fusion welding. The fusion welding involves attaching electrical leads from a remote power source to the first contact ear 62 and the second contact ear 64 of the coupler 60 so that the electrical current can be applied directly to the coupler from the remote power supply. Fusion welding reduces the chances of electrical or heat damage to the horn switch 12.

Figure 4:
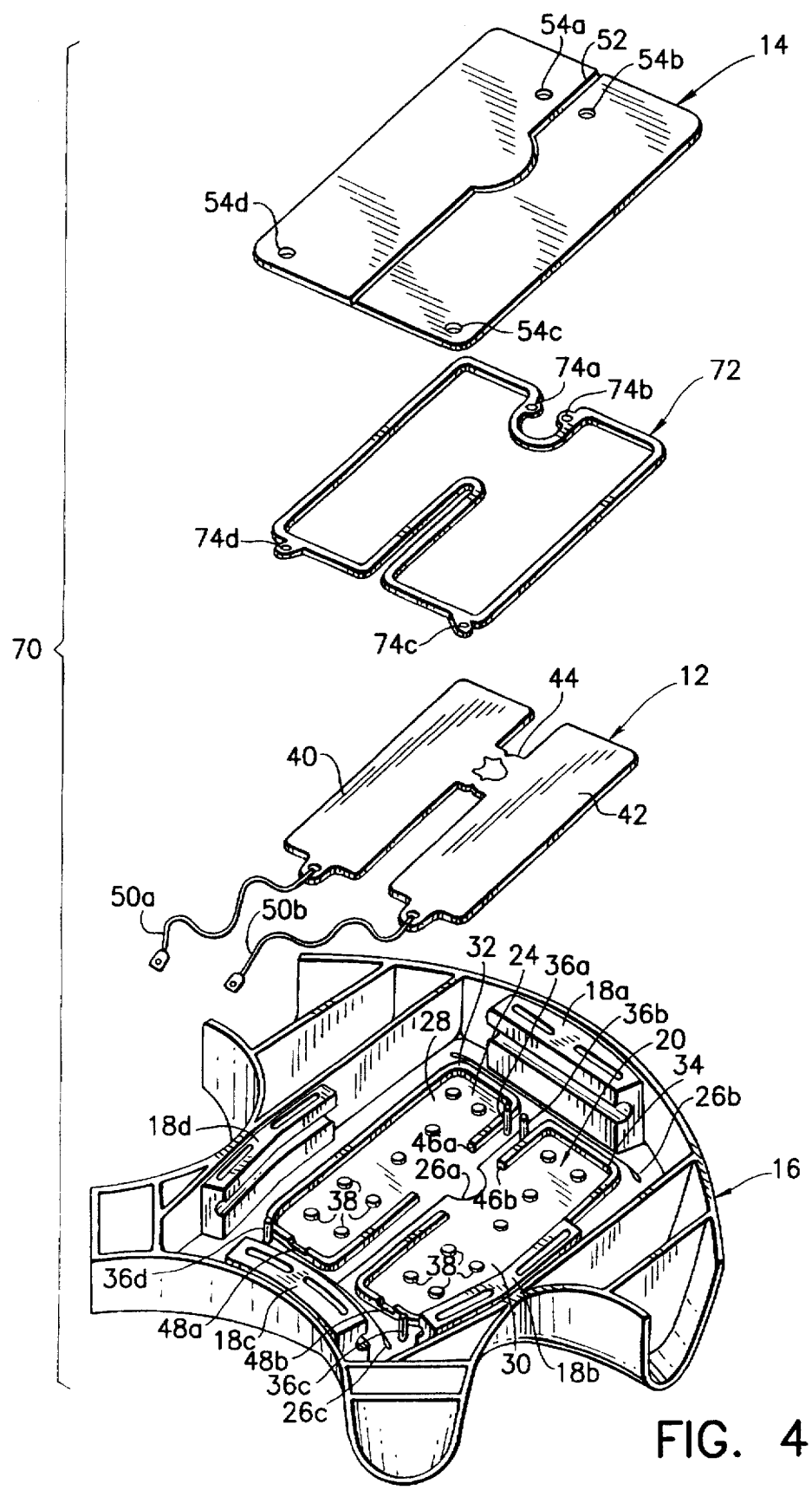
FIG. 4 is an exploded, perspective view of another airbag module cover according to the present invention.

Referring to FIG. 4, another airbag module cover assembly 70 according to the present invention is provided. The airbag module cover assembly 70 of FIG. 4 is similar to the airbag module cover assembly 10 of FIGS. 1 through 3, and elements that are the same have the same reference numerals. The airbag module cover assembly 70 includes a coupler 72 that is similar to the coupler 60 of FIGS. 1 through 3, but is a closed circuit in the shape of the first and the second raised ridges 32,34. This type of coupler is for use with an induction welding method of attaching the backing plate 14 to the module cover 16. The coupler 72 also defines four openings 74a,74b,74c,74d receiving the four posts 36a,36b, 36c,36d extending from the inner face 24 of the switch cover panel 20 for correctly positioning the coupler with respect to the first and the second raised ridges 32,34.

A method of attaching the backing plate 14 to module cover 16 using induction welding is the same as the method of attachment using fusion welding described above except that leads from a remote power source are not attached to the coupler 72. Instead, a coiled wire (not shown) in the shape of the coupler 72 is placed over the switch backing plate 14 in alignment with the coupler, and an electrical current from a remote power source is run through the coiled wire. The electrified coiled wire creates electromagnetic energy which passes through the backing plate 14 and into the electrically conductive coupler 72, creating an electrical current in the coupler. The coupler 72 and a portion of the backing plate 14 and a portion of the first and the second raised ridges 32,34 in contact with the coupler then melt and bond. A method of removing the secured switch backing plate 14 from the module cover 16 using induction welding for repair or replacement of the horn switch 12 is also provided and is the same as the method of removing the backing plate using fusion welding as described above except that an electrical current is applied to the coupler 72 by electromagnetic energy.

The present invention, therefore, provides a novel, simple and effective horn switch backing plate attachment and a method of attaching a backing plate to a module cover. Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

I claim:

1. An airbag module cover assembly with a horn switch for operation by a vehicle driver, the cover assembly comprising:

a module cover including a paintable thermoplastic switch cover panel having an outer face and an inner face, the outer face forming a portion of the airbag module cover presented to the driver, the switch cover panel deformably depressible from the outer face;

a horn switch received adjacent the inner face of the switch cover panel;

a thermoplastic raised ridge spacer extending inwardly from and substantially surrounding the inner face of the switch cover panel, the spacer peripherally retaining the horn switch;

a thermoplastic switch backing plate supported by the spacer and extending over and retaining the horn switch within the spacer, the spacer having a height greater than a thickness of the horn switch so that the horn switch does not substantially contact both the backing plate and the inner face simultaneously and, therefore, is not compressed between the backing plate and the inner face prior to the switch cover panel being depressed by a vehicle driver; and a generally flat, electrically conductive, thermoplastic coupler in the shape of the raised ridge spacer positioned between the spacer and the backing plate, the coupler fused to both the spacer and the backing plate, securing the backing plate to the module cover.

2. The airbag module cover assembly of claim 1 wherein the horn switch is not secured to either the inner face of the switch cover panel, the spacer or the backing plate.

3. The airbag module cover assembly of claim 1 further comprising a plurality of spaced-apart force concentrators extending inwardly from the inner face of the switch cover panel towards the horn switch, the height of the spacer being greater than a sum of both the thickness of the horn switch and a height of the force concentrators.

4. The airbag module cover assembly of claim 1 wherein the switch cover panel of the module cover defines at least one tear seam.

5. The airbag module cover assembly of claim 1 wherein the coupler is polyethylene.

6. The airbag module cover assembly of claim 1 wherein the coupler is a closed circuit.

7. The airbag module cover assembly of claim 1 wherein the coupler is an open circuit and extends from a first contact ear to a second contact ear.

8. The airbag module cover assembly of claim 1 wherein:
the switch cover panel of the module cover defines a tear seam dividing the inner face into a first half and a second half;

a plurality of spaced-apart raised force concentrators are unitary with and extend inwardly from the first half and the second half of the inner face of the switch cover panel;

the horn switch is a membrane horn switch having a first section received adjacent the first half of the inner face, and a second section received adjacent the second half of the inner face, the first section of the horn switch connected to the second section by a bridge member;

the spacer is unitary with the inner face of the switch cover panel and includes a first raised ridge portion substantially surrounding the first half of the inner face and peripherally retaining the first section of the membrane horn switch, and a second raised ridge portion substantially surrounding the second half of the inner face and peripherally retaining the second section of the membrane horn switch;

the switch backing plate defines a tear seam generally positioned over the tear seam of the switch cover panel, the height of the spacer being greater than the sum of the thickness of the membrane horn switch and a height of the force concentrators, the membrane horn switch unsecured to either the inner face, the spacer or the backing plate.

9. The airbag module cover assembly of claim 8 wherein the coupler is polyethylene.

10. The airbag module cover assembly of claim 8 wherein the coupler is a closed circuit.

11. The airbag module cover assembly of claim 8 wherein the coupler is an open circuit and extends from a first contact ear to a second contact ear.

12. A method of attaching a horn switch backing plate to a module cover comprising:

A) providing a module cover comprising:
 a paintable thermoplastic switch cover panel having an outer face and an inner face, the outer face forming a portion of the module cover presented to the driver, the switch cover panel deformably depressible from the outer surface;
 a thermoplastic raised ridge spacer extending inwardly from and substantially surrounding the inner face;

B) providing a horn switch and positioning the horn switch adjacent the inner face such that the horn switch is peripherally retained by the spacer;

C) providing a generally flat, electrically conductive, thermoplastic coupler generally in the shape of the raised ridge spacer, and positioning the coupler on the spacer;

D) providing a generally flat and rigid switch backing plate, positioning the switch backing plate on the coupler so that the switch backing plate extends over and retains the horn switch within the spacer; and E) applying pressure to the backing plate and applying an electrical current to the coupler until the coupler and a portion of the backing plate and a portion of the spacer in contact with the coupler melt and fuse together, securing the backing plate to the module cover.

13. The method of attaching a horn switch backing plate to a module cover of claim 12 wherein the coupler is polyethylene.

14. The method of attaching a horn switch backing plate to a module cover of claim 12 wherein:
 the coupler is a closed circuit.

15. The method of attaching a horn switch backing plate to a module cover of claim 12 wherein:

the coupler is an open circuit extending from a first contact ear to a second contact ear; and the electrical current is applied directly to the coupler by attaching leads from a remote power source to the first and second contact ears of the coupler.

16. A method of repairing or replacing a horn switch of an airbag module cover comprising:

A) providing an airbag module cover comprising:
 a module cover including a paintable thermoplastic switch cover panel having an outer face and an inner face, the outer face forming a portion of the module cover presented to the driver, the switch cover panel deformably depressible from the outer surface;
 a horn switch received adjacent the inner face;
 a thermoplastic raised ridge spacer extending inwardly from and substantially surrounding the inner face, and peripherally retaining the horn switch;
 a switch backing plate supported by the spacer and extending over and retaining the horn switch within the spacer; and
 a generally flat, electrically conductive, thermoplastic coupler in the shape of the raised ridge spacer and positioned between the spacer and the backing plate, the coupler fused to both the spacer and the backing plate, securing the backing plate to the module cover;

B) applying an electrical current to the coupler until the coupler and a portion of the backing plate and a portion of the spacer in contact with the coupler melt;

C) removing the switch backing plate and the coupler from the spacer and removing the horn switch;

D) providing a replacement horn switch and positioning the horn switch within the spacer adjacent the inner face;

E) repositioning the coupler on the spacer;

F) repositioning the switch backing plate on the coupler, so that the switch backing plate extends over and retains the horn switch within the spacer; and G) applying pressure to the backing plate and applying an electrical current to the coupler until the coupler and a portion of the backing plate and a portion of the spacer in contact with the coupler melt and fuse together, securing the backing plate to the module cover.

17. The method of repairing or replacing a horn switch of an airbag module cover of claim 16 wherein the coupler is polyethylene.

18. The method of repairing or replacing a horn switch of an airbag module cover of claim 16 wherein:
 the coupler is a closed circuit.

19. The method of repairing or replacing a horn switch of an airbag module cover of claim 16 wherein:
 the coupler is an open circuit extending from a first contact ear to a second contact ear; and
 the electrical current is applied directly to the coupler by attaching leads from a remote power source to the first and second contact ears of the coupler.

* * * * *